United States Patent [19]

Pencak

[11] 4,116,043

[45] Sep. 26, 1978

[54] ELECTRONIC DETECTION APPARATUS FOR LEAKS

[75] Inventor: John George Pencak, Fairport, N.Y.

[73] Assignee: American Can Company, Greenwich, Conn.

[21] Appl. No.: 814,734

[22] Filed: Jul. 11, 1977

[51] Int. Cl.² ............................................. G01M 3/24
[52] U.S. Cl. ...................................................... 73/40
[58] Field of Search ................... 73/40, 40.5 A, 41, 45, 73/45.1, 45.2, 49.2, 592

[56] References Cited

U.S. PATENT DOCUMENTS

| 3,266,296 | 8/1966 | Hall | 73/40.5 A |
| 3,399,563 | 9/1968 | Helms | 73/40.5 A |
| 3,792,606 | 2/1974 | Munger | 73/40 |

FOREIGN PATENT DOCUMENTS

762,735  12/1956  United Kingdom .......................... 73/40

Primary Examiner—Richard C. Queisser
Assistant Examiner—Joseph W. Roskos
Attorney, Agent, or Firm—Robert P. Auber; Ira S. Dorman; Douglas W. Wyatt

[57] ABSTRACT

This invention is an improved electronic detection system for leaks in articles such as can tops and the like comprising a special ultrasonic microphone-amplification system for listening for leaks in articles, a signal averaging network to receive the signal produced by the amplifier and to improve the signal to noise ratio, an enable circuit which is synchronized with the pressurization of the article to be leak tested and which triggers the signal averaging network and a comparator to receive the averaged signal from the signal averager. The comparator produces a logic pulse for rejecting leaky articles when the averaged signal produced by the signal averaging network is above a predetermined level.

4 Claims, 2 Drawing Figures

ELECTRONIC DETECTION APPARATUS FOR LEAKS

BACKGROUND OF THE INVENTION

The present invention relates to an improved electronic system for an ultrasonic leak detector, and more particularly such an electronic system for use in connection with a high speed can top leak detection mechanism.

A separate invention comprising an improvement in the mechanical apparatus for ultransonic leak testing is the subject of a separate patent application by G. Mosher. That application Ser. No. 772,330 is entitled "Ultrasonic Leak Hole Detection Apparatus And Method" and was filed Feb. 25, 1977. That application is incoporated by reference herein for its disclosure of the aforesaid mechanical apparatus.

At present, leakage detection systems of various types are used to detect leakage that may occur from containers. In one sensitive leakage detector system a container to be tested is filled with helium gas under pressure and any leaks are detected by a sensitive gas detector instrument such as a gas mass spectrometer. That type of leakage detection, although highly accurate and sensitive, is relatively slow and expensive and may not be suitable for testing containers or container parts, such as can tops, produced at a high rate of production. In another widely used system a fluid, such as compressed air, is pumped into a container and the container submerged in water. An operator looks for bubbles and rejects those containers which show leakage. That system is relatively slow, relatively insensitive to very small leaks, and dependent upon the attentiveness and diligence of the operators.

It has also been suggested that a fluid, such as compressed air, be applied in bursts to one side of a container part and an ultrasonic microphone be located on the other side of the part. The microphone detects the ultrasonic high frequency — 20,000–100,000 Hz — sound of the air escaping through any holes in the part being tested. That system is relatively fast and relatively sensitive to small holes. It has been necessary in a noisy factory environment to locate the ultrasonic microphone in a chamber to prevent background factory noise, which may be in the same ultrasonic frequency range, from appearing, to the microphone, as a leaking part.

A major difficulty with that type of ultrasonic leakage detection system is that, although fast compared to helium or bubble detection, it is relatively slow compared to the very high production rates possible in part production. For example, the can ends of "pull tab" cans, consisting of a stamped can end having a pull tab with a ring, may be produced at more than 300 per minute i.e. 5 every second. The prior ultrasonic leakage inspection systems discussed in connection with the prior art mentioned below, have been slower than that rate of production, for example, a maximum speed of inspection of about 100 can tops per minute. The alternatives, using such prior art systems, are (i) to inspect only one can top out of three — which is not desirable as each can top should be individually inspected for leakage or (ii) have three or more inspection machines for each production machine. The second alternative is also not desirable because of the expense in installation, repair, maintenance and operation of the larger number of inspection machines and the complexity of the conveyor and control systems associated with a plurality of inspection machines.

U.S. Pat. No. 3,399,563 to Helms detects leaks in can ends using exterior pressure against the can end and a microphone within a chamber. The chamber is "hermetically sealed" (col. 4, line 44). Helms suggests that a liquid be applied to the can end to enhance leak noise.

U.S. Pat. No. 3,792,606 to Munger describes a leak detector in which a chamber is employed to reduce background noise. Munger utilizes a screen to enhance leak noise.

U.S. Pat. No. 3,795,137 to Lo describes a method for testing aerosol cans for leaks. The can is formed, filled and sealed and tested for leaks due to internal pressure. The testing device uses a circular table with can spaces created by metal blocks on the peripheral portion. As the table turns, the can enters a tunnel which, at the halfway point, has a microphone recessed in an alcove. The openings provide for can access to the test area while the clearance permits table rotation with minimum friction.

U.S. Pat. No. 3,224,252 to Hamilton is directed to "testing" containers for leaks (col. 1, line 9) and supplies internal pressure to the container to be tested. A pressure equilibrium is established between the container and a "sound box." A container leak will cause gas to flow through the chamber, vibrating a reed, the vibrations being detected by a microphone.

U.S. Pat. No. 3,266,296 to Hall describes three methods for inspecting angular work pieces (such as automobile rims). First, a chamber is created about the exterior of the rim using an inflatable rubber seal. Leak noise is detected by a microphone in the interior of the rim. Secondly, two sealing plates are applied to the inside and outside faces of the rim andpressure is applied through the interior of the rim. Any leaks are detected on the outside by a microphone. Thirdly, a closed chamber is formed through inflatable seals around both the interior and the exterior of a selected portion of the rim and the microphone is within the sealed chamber.

Previously, various signal averaging circuits for averaging an electronic signal to improve the signal to noise ratio have been patented including, for example, U.S. Pat. No. 3,087,487, isssued to M. E. Clynes. These circuits, applied to, for example radar and patient medical testing, allow an improvement in the signal which, in turn, allows an increase in detection sensitivity.

SUMMARY OF THE INVENTION

According to the novel method of this invention, a special microphone is used to detect an ultrasonic vibration produced by pressurized air rushing through a leak in a defective articl such as a can top. The signal from the microphone is then amplified by a preamplifier and an amplifier. The amplified signal from the amplifier is then applied to a signal averaging network.

An enable circuit is synchronized in time to become enabled with the shot of air causing pressurization of the can top. The enabling of the enable circuit triggers a signal averaging network, which network integrates and smooths the signal to reduce the adverse effects of noise. The signal from the signal averager is then applied to a voltage comparator circuit which provides an output pulse to a logic device. The logic device rejects the leaky article, when the average amplified microphone signal and hence, the leak, exceeds a certain reference level.

It is an object of this invention to provide an improved electronic detection system for the detection of leaks in can tops and similar articles and which provides an electronic logic pulse at a faster rate than the previous system.

It is also an object of this invention to provide a more sensitive and rapid method for detecting leaks in can tops and similar articles.

It is a further object of this invention to provide a more reliable method of detecting leaks in can tops which will provide a rejection pulse only when there is an actual leak, that is, it will not reject good can tops that do not leak.

It is also an object of this invention to provide an apparatus of improved sensitivity able to detect large as well as small leaks in can tops.

The advantages of this invention will be made apparent by reference to the accompanying drawings.

DETAILED DESCRIPTION OF THE INVENTION

Figure 1:
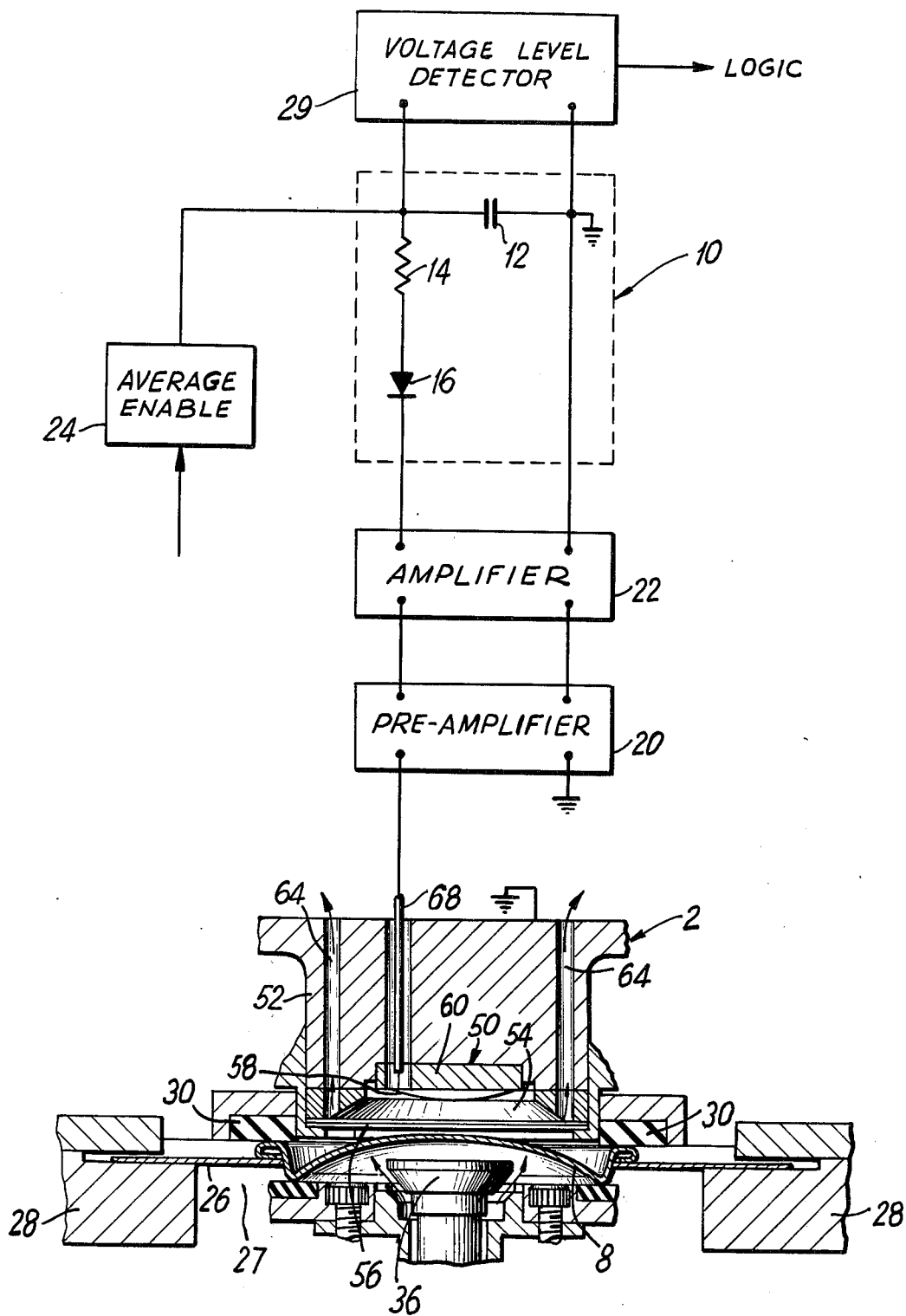
FIG. 1 is a block diagram of the novel electronic leak detection apparatus of this invention also including a cross-section of a portion of an apparatus which may be used to apply pressurized air to a can top for leak testing and to contain the microphone for sensing the ultrasonic vibration produced by a leak.

A block diagram of the novel electronic leak detection apparatus of this invention appears in FIG. 1 which additionally contains a portion of an apparatus 2 which may be used to hold both the article to be leak tested and a portion of the electronic apparatus of this invention. The article, such as a can top 8, which is to be leak tested is moved into position by a transport belt 26 which moves through belt guide 28 so as to form one wall of an enclosed air chamber 27 by resting on a polyurethane seal 30. Said chamber 27 also has an air valve 36 which when it is opened delivers pressurized air from a compressed air source (not shown). A microphone 50 contained in a cylindrical housing 52 is positioned immediately above the can top 8, said microphone housing 52 containing vents 64 through which air may be exhausted, after admission to said microphone chamber 54. In the apparatus used to hold the can top 8 shown in FIG. 1 and the microphone 50, to increase the ultrasonic leak noise, screen 56 is positioned between said microphone 50 and said cap top 8. An insulating disk 60 is positioned immediately above the microphone diaphragm 58 so as to insulate the microphone 50. An electrical cable 68 is used to connect said microphone 50 to a preamplifier 20 which amplifies the electronic signal produced by said microphone 50.

In operation, valve 36 is opened so as to pressurize the air chamber 27. If there is an aperature in the can top 8, an ultrasonic vibration will be caused by air rushing from the air chamber 27 through the aperature to the microphone chamber 54, said air being subsequently exhausted through air vents 64. The novel electronic leak detection apparatus of this invention comprises the microphone 50 and the additional electronic apparatus shown in the block diagram of FIG. 1 necessary to produce a logic pulse which may be used as an electronic trigger to reject a leaky article mechanically. The details of the apparatus to apply pressurized air to the can top 12 or any other article to be leak tested do not constitute the invention described here, but instead constitute part of a separate invention which has been described in the aforementioned U.S. patent application.

The microphone 50 may be an "IDEX" condenser microphone having especially useful characteristics for leak detection and is described in U.S. Pat. No. 3,399,563 issued to E. Helms, Sept. 3, 1968. It is connected to a preamplifier 20 which preamplifier is connected to an amplifier 22, said preamplifier and amplifier together constituting an amplifying means for the electronic signals generated by the said microphone 50.

The preamplifier used to provide the initial stage of the amplification is a one-stage solid state amplifier coupled to an emitter-follower. In the preferred embodiment the base of one transistor, for example RCA 2N5828, is coupled to the collector of another transistor, for example RCA 2N5828, in the amplifier stage. The base of the RCA 2N5828 transistor, in the one-stage amplifier, is connected to +15 volts through a 180 K ohm resistor. The output from the preamplifier is taken directly from the emitter of the transistor in the emitter-follower circuit. The microphone output terminal is directly connected through a capacitance, preferably 0.033 microfarad, to the base of the transistor in the amplifier circuit. The emitter of the transistor is connected through a resistor, preferable 51 K ohm to ground and through a capacitor, inductor and resistance in series to ground. The collector of the amplifier stage transistor is connected through a 51 K ohm resistor to ground and the collector of the emitter-follower is connected to the +15 volt terminal through 370 ohm resistor. The +15 volts terminal is connected to ground through a capacitor having preferably a capacitance of 0.25 microfarad. Additional inductances and capacitances may be used in this circuit.

The amplifier utilized in the preferred embodiment of this invention comprises an RCA 3052 integrated circuit available from RCA. This amplifier is attached to the preamplifier output at terminal 9 through a capacitor, preferably having a capacitance of 0.1 microfarad and a breakdown voltage of 200 VDC. Terminal 12 of the RCA 3052 is connected to a power supply having at 15 V potential with respect to ground through a resistance, preferably a 22 ohm resistance connected in series with a 75 ohm resistance. The point between the 22 ohm resistance and the 75 ohm resistance is connected to ground through a capacitor having preferably a capacitance of 25 microfarads and a 25 volt breakdown voltage terminal 12 is also connected directly to ground through a capacitor, preferably having a capacitance of 15 microfarad and a breakdown voltage of 20 volts dc terminal 12 of the RCA 3052 integrated circuit is connected to terminal 15 directly through a 200 ohm resistor in the preferred embodiment described here. Terminal 15 is connected to ground by a capacitor, preferably a 15 microfarad capacitor having a breakdown voltage of 20 VDC. Furthermore, terminal 10 is connected to ground through a capacitor; preferably having a capacitance of 15 microfarad and a 20 V breakdown voltage. Terminal 11 is connected to ground through a capacitor, preferably with capacitance of 0.0068 microfarad and having a breakdown voltage of 200 volts, connected in series with the coil of a 1 K ohm voltage divider. Terminal 14 is connected to the contact arm of the voltage divider through a capacitance having a preferred value of 0.0068 microfarad and a breakdown voltage of 200 volts. The contact arm of the voltage divider is also connected directly to ground through a 100 ohm resistor. Terminal 5 and 2 of the RCA 3052 are connected directly to ground. Terminal 6 is connected to ground through a capacitor preferably a 0.047 microfarad, 50 V breakdown voltage connnected to a resistance of 47 ohms.

Terminal 1 is connected to ground through a capacitor connected in series with a resistor, the capacitor having a preferred capacitance of 0.047 microfarad and a resistance of 47 ohms. Terminal 16, the output terminal of the RCA 3052 amplifier chip is connected to the diode of the signal averager circuit through a capacitor, C12, preferably having a 4.7 microfarad capacitance and a breakdown voltage of 35 volts DC. The input terminal of the diode is connected to ground through a resistance, preferably a 1 K ohm resistor.

The signal averaging circuit, as described above, comprises a diode, preferably a IN 4001 diode, a resistance, preferably a 100 ohm ½ watt variable resistance, and a capacitor, preferably having a capacitance of 2.2 microfarad and a break-down voltage of 50 VDC, are all connected in series in that order to ground. The end of the resistor closest to ground is the output of the signal averager and provides the output signal for any voltage leveler circuitry and logic circuitry. The 100 ohm variable resistor may after calibration be replaced by a fixed resistance whose value cannot be adjusted on the site of the factory location.

The amplifier 22 is connected to a signal averaging network, 10. The signal averaging network 10 comprises a diode 16 and a resistor 14 in series. A condenser 12 is connected across the output terminals of the amplifier 22. One terminal of the condenser 12 is attached to ground.

The signal averaging network 10 is connected to a voltage level detector 29 which produces a logic pulse used to control the rejection of leaky can tops, when the inputed averaged amplified electronic signal from the microphone 50 exceeds a reference signal provided to the detector 29. The voltage level detector 29 may be a comparator, the details of which are not critical to the invention and may be of conventional design using an operational amplifier, for example, to compare the voltage drop across the capacitor in the signal averaging network 10 to a reference voltage produced by a power supply (not shown in the block diagram of FIG. 1).

The signal averaging network 10 is triggered by an enable circuit 24 which is synchronized to the pressurization of the air chamber 27. The signal averaging and detection commences shortly after pressurization upon receipt of a pulse from the enable circuit 24.

The noise present in the signal averaging network is minimized by discharging the capacitor in the averaging circuit with a pulse from an enable circuit. The enable circuit is triggered by a rotary switch whose rotating member is synchronized to the pressurization of the article to be tested. The rotary switch may be an optomech switch available from Optometic Co. of California. The 5 volt output of the optomech switch is connected to the enable circuit which includes a GE-10 transistor whose base is connected to the optomech switch through a resistor, preferably of 4.7 K ohms. A capacitor, having preferably a capacitance of 27 pf and a breakdown voltage of 50 VDC, is connected in parallel with the base input capacitor. The base of the GE-10 transistor is also connected in series through a resistor, preferably 4.7 K ohms to another resistor, preferably 22 K ohm resistor is connected to a −15 VDC source of potential. The emitter of the GE-10 transistor is grounded and also connected through a resistance, having preferably a 4.7 K ohm resistance, to the same 22 K ohm resistance that is connected to the −15 VDC potential. The collector of the transistor is connected to the output terminal of the signal averaging network and through a 8.2 Megohm resistor to a +15 volt DC potential.

Figure 2:
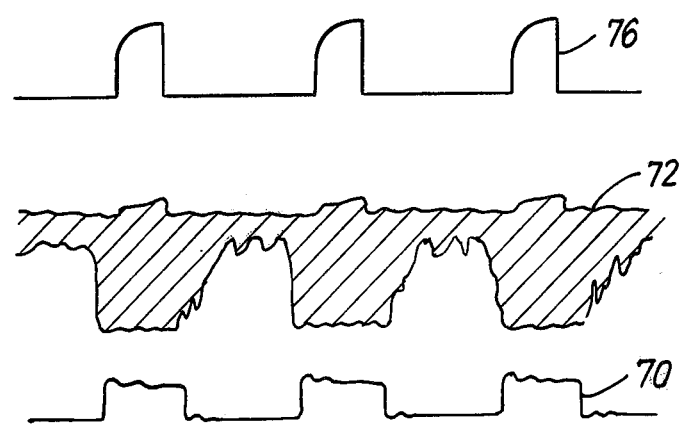
FIG. 2 is a graphical representation showing the pressure applied to the article to be leak tested, the electronic noise accompanying the amplified microphone signal, and the averaged amplified microphone signal for the case of a leaking article.

An oscilloscope trace of the pressure in the air chamber 27 (the trace being labeled 70) a trace of the averaged amplified electronic signal from the microphone 76, and the associated electronic noise 72 for the case of leaking can top 12 is shown in FIG. 2. The average enable circuit 24 which is connected to the air chamber 27 provides a pulse to the signal averaging network 10, when the chamber 27 is pressurized and may be any of a variety of commercially available units such as an Optimac unit, which is a transducer which produces a pulse when energized by a rotary member.

In operation, air chamber 27 is pressurized causing air to flow through a leak in the article being tested, such as a can top 8, causing an ultrasonic vibration. The ultrasonic vibration is detected by the microphone 50 which produces an electronic signal which is amplified by the amplifying means comprising a preamplifier 20 and an amplifier 22. The amplified microphone signal is signal averaged to reduce the electronic noise component of that signal, said signal averaging being initiated by a trigger pulse produced by the enable circuit 24 when air chamber 27 is pressurized. The signal produced by the signal averaging network 10 is compared to a reference voltage in voltage level detector 29 to produce a logic pulse, if the signal level exceeds the reference voltage. The logic pulse actuates a mechanism (not shown) which may immediately reject the can top or reject the can.

I claim:

1. An electronic detecting apparatus for sensing the ultrasonic noise produced by a fluid flowing under pressure through a leak in an article comprising
   a microphone positioned near said article,
   an amplifier means connected to said microphone so as to receive and amplify the electronic signal generated by said microphone,
   a signal averaging means connected to the output terminals of said amplifier means to receive and average the signal generated by said amplifier device,
   an enable circuit connected to said signal averaging means to provide an enable trigger pulse to said signal averaging means when said pressure is applied to said fluid to thereby start the operation of said signal averaging network,
   a voltage level detector circuit connected to said signal averaging means, said voltage level detector providing a logic pulse useful for article processing when the voltage to said voltage level detector from said signal averaging network exceeds a reference voltage.

2. An apparatus according to claim 1 wherein said signal averaging network comprises a diode, a resistor, and a capacitor connected in series across the output terminals of said amplifier device, and the input terminals of said voltage level detector are connected across said capacitor.

3. An apparatus according to claim 2 wherein said amplifier device comprises a preamplifier connected to said microphone so as to receive a signal therefrom and an amplifier connected to said preamplifier to receive a signal therefrom and to further amplify said signal generated in said preamplifier stage.

4. A method of detection of the ultrasonic signal that results from forcing a fluid through an aperature comprising the steps in sequence of converting said ultrasonic signal to an electronic signal by a microphone positioned near said aperature, amplifying said electronic signal in an amplifying device connected to said microphone, triggering and clearing a signal averaging network by sending a trigger pulse thereto from an enable circuit which is attached to said signal averaging network and which is synchronized to the application of pressure to force said fluid through said aperature in said article, averaging the electronic signal produced by said amplifying device by the signal averaging network connected to said amplifying device to reduce noise on said signal, comparing the signal produced by said signal averager to a reference voltage in a voltage level detector circuit attached to said signal averaging network, and producing a logic pulse in said comparator circuit, when said signal from said signal averager exceeds said reference voltage.

* * * * *